United States Patent [19]
Putnam

[11] 3,929,241
[45] Dec. 30, 1975

[54] TRANSPORT RIG
[75] Inventor: Alvin A. Putnam, San Antonio, Tex.
[73] Assignee: H. B. Zachry Co., San Antonio, Tex.
[22] Filed: Aug. 8, 1973
[21] Appl. No.: 386,838

Related U.S. Application Data
[63] Continuation-in-part of Ser. No. 164,524, Aug. 21, 1971, abandoned.

[52] U.S. Cl. .............. 214/390; 280/34 A; 214/1 H; 280/43.23; 254/188
[51] Int. Cl.² ............................................ B60P 3/40
[58] Field of Search.................. 214/390, 392, 394; 280/423 R, 423 A, 415 R, 415 B, 34 A; 254/144, 183, 184, 185, 188, 189, 149

[56] References Cited
UNITED STATES PATENTS

| | | | |
|---|---|---|---|
| 385,181 | 6/1888 | Huntly | 214/390 X |
| 1,905,273 | 4/1933 | Dunlop | 254/149 X |
| 3,520,430 | 7/1970 | Dunbar | 214/390 |
| 3,521,898 | 7/1970 | Fulmer et al. | 280/43.23 |
| 3,795,336 | 3/1974 | Acker | 214/390 |

Primary Examiner—Albert J. Makay
Attorney, Agent, or Firm—Christie, Parker & Hale

[57] ABSTRACT

A transport rig for moving a heavy load, such as a concrete modular building unit, includes a pair of load-carrying frames supporting the front and rear ends of the load. Front and rear hydraulic cylinders are secured between corresponding front and rear load-carrying frames and running gear at the front and rear, respectively, of the transport rig to support the load above the ground. An adjustable cable extends from one load-carrying frame to the other beneath the load and is drawn tight to secure the load-carrying frames together. The opposite ends of the cable are connected to a pair of power-operated winch drums on one load-carrying frame, and the cable is reeved in a closed loop around guide means on the front and rear load-carrying frames. The winch drums can be power-operated to shorten the effective length of the cable and pull the load-carrying frames tightly against the front and rear ends of the load. The load is removed from the transport rig by contracting the front and rear hydraulic cylinders to lower the load-carrying frames to place the load on a foundation or the like. The load-carrying frames may be shifted laterally in either direction to properly position the load directly above the foundation before the load is finally placed on the foundation. The cable is then disabled so the load-carrying frames can be separately removed from the ends of the load.

17 Claims, 21 Drawing Figures

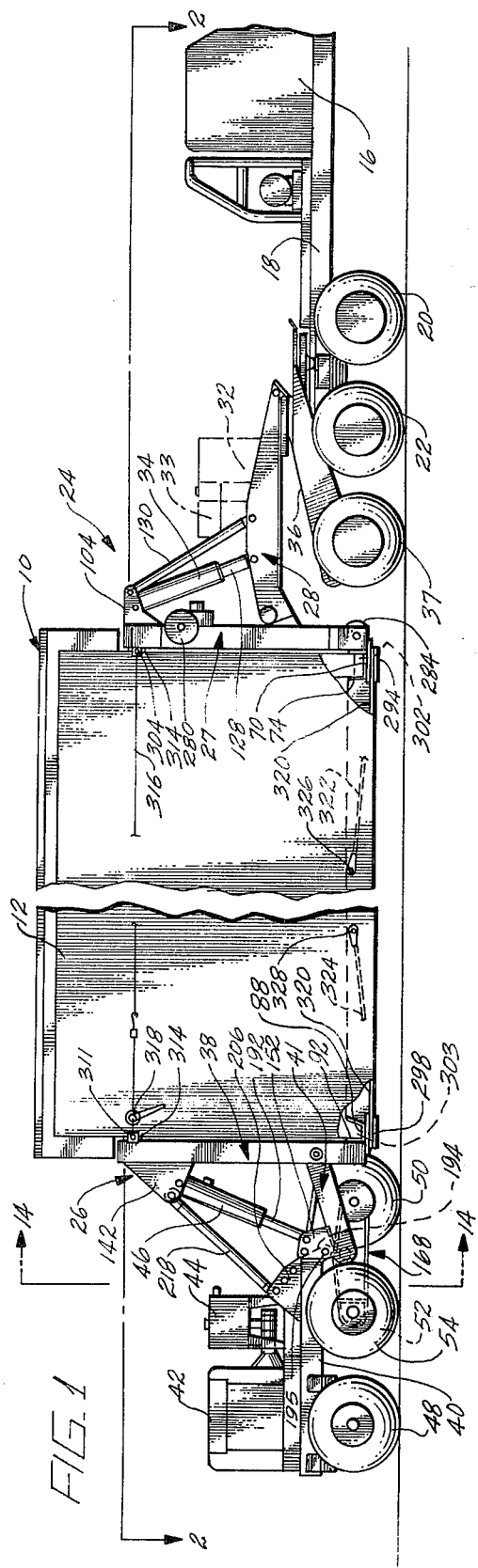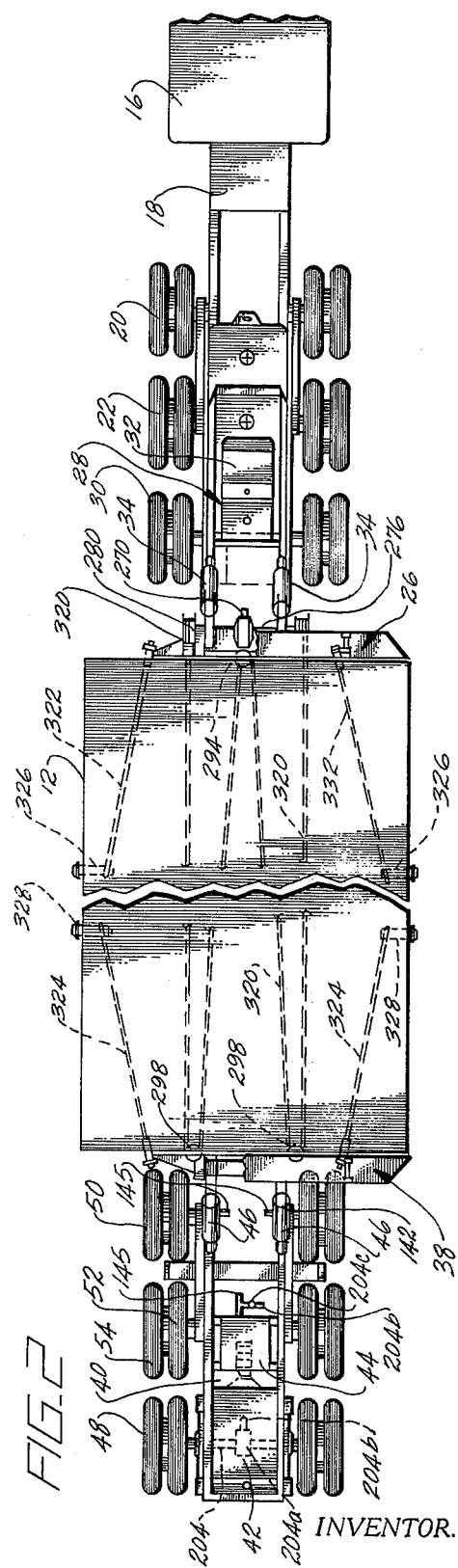

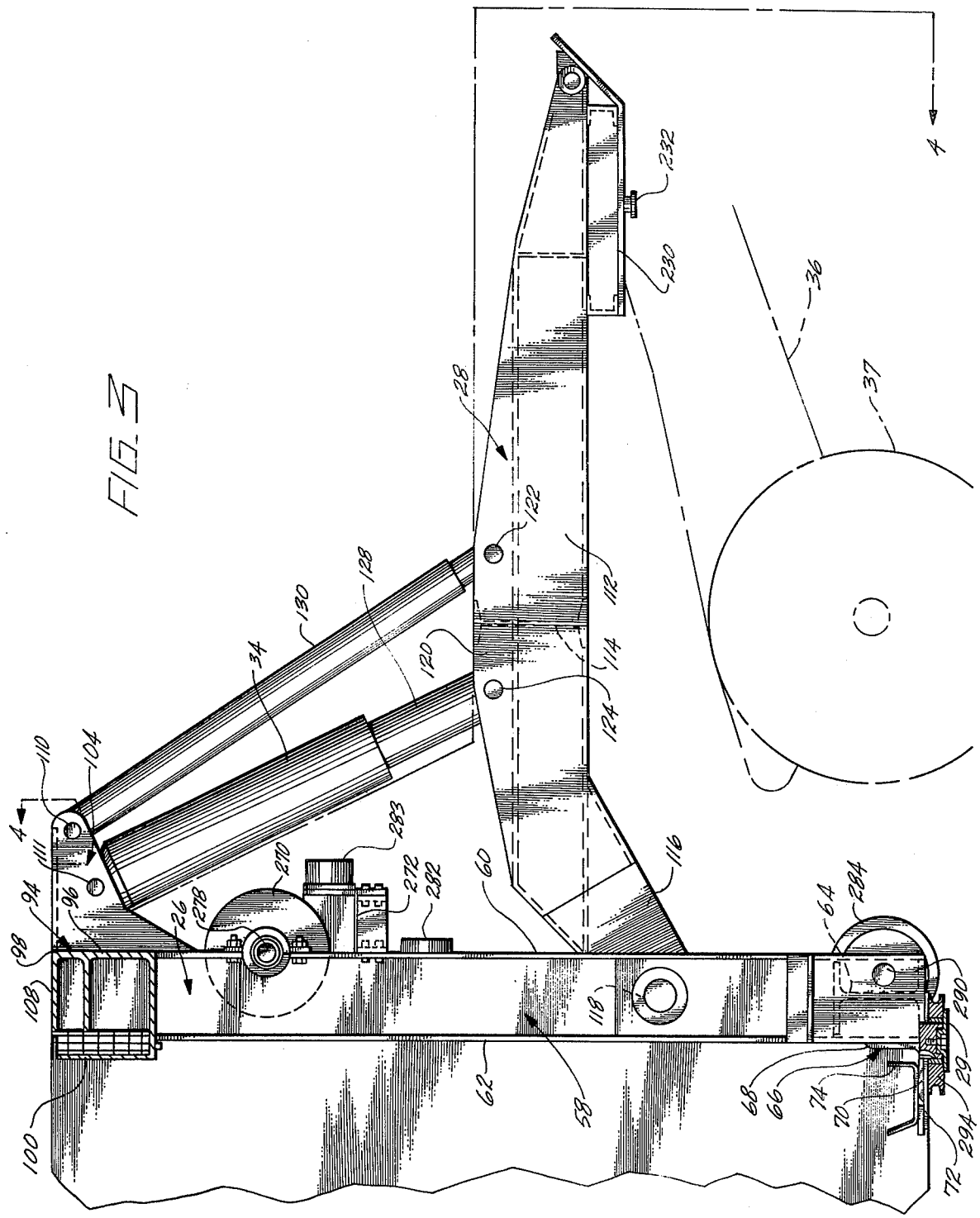

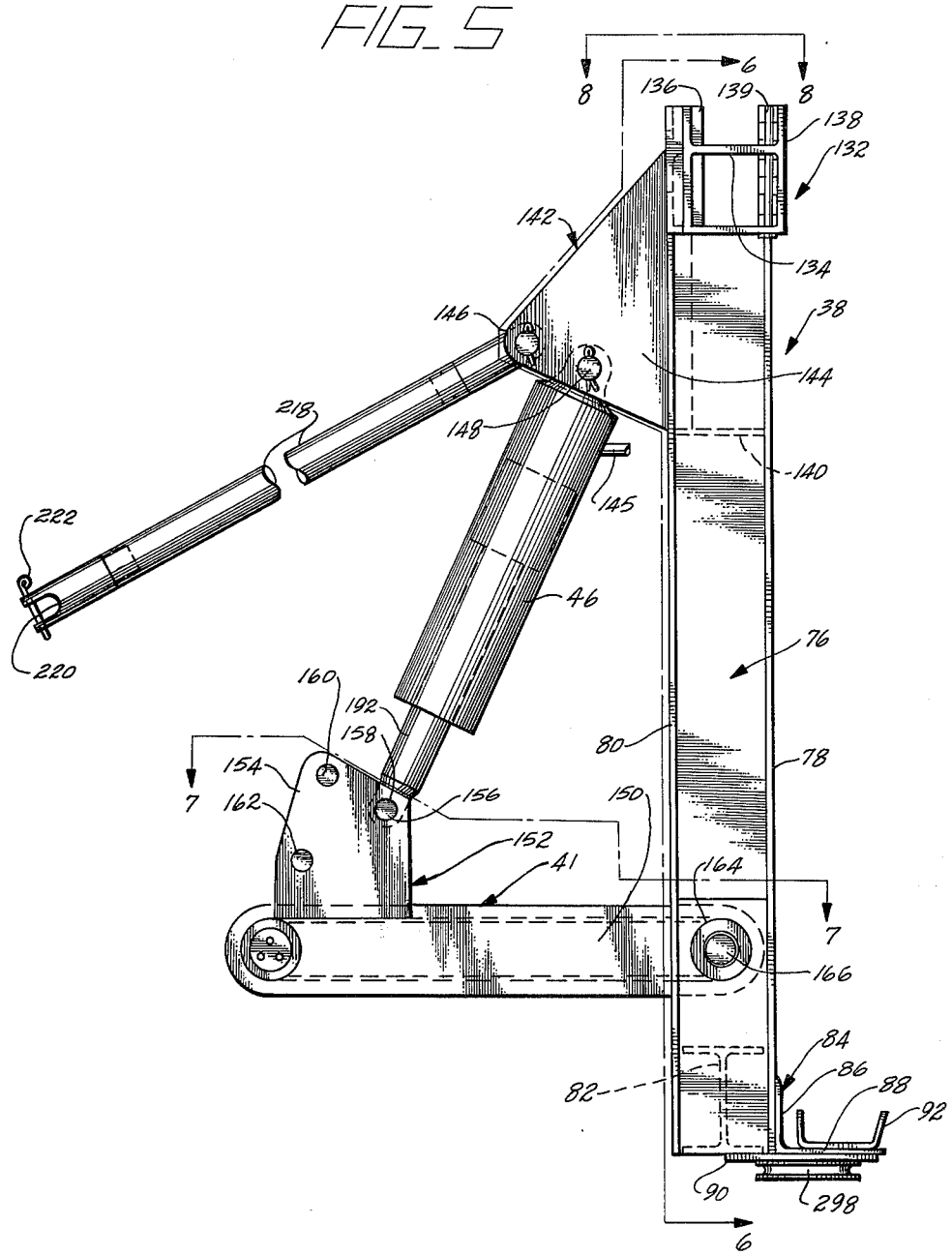

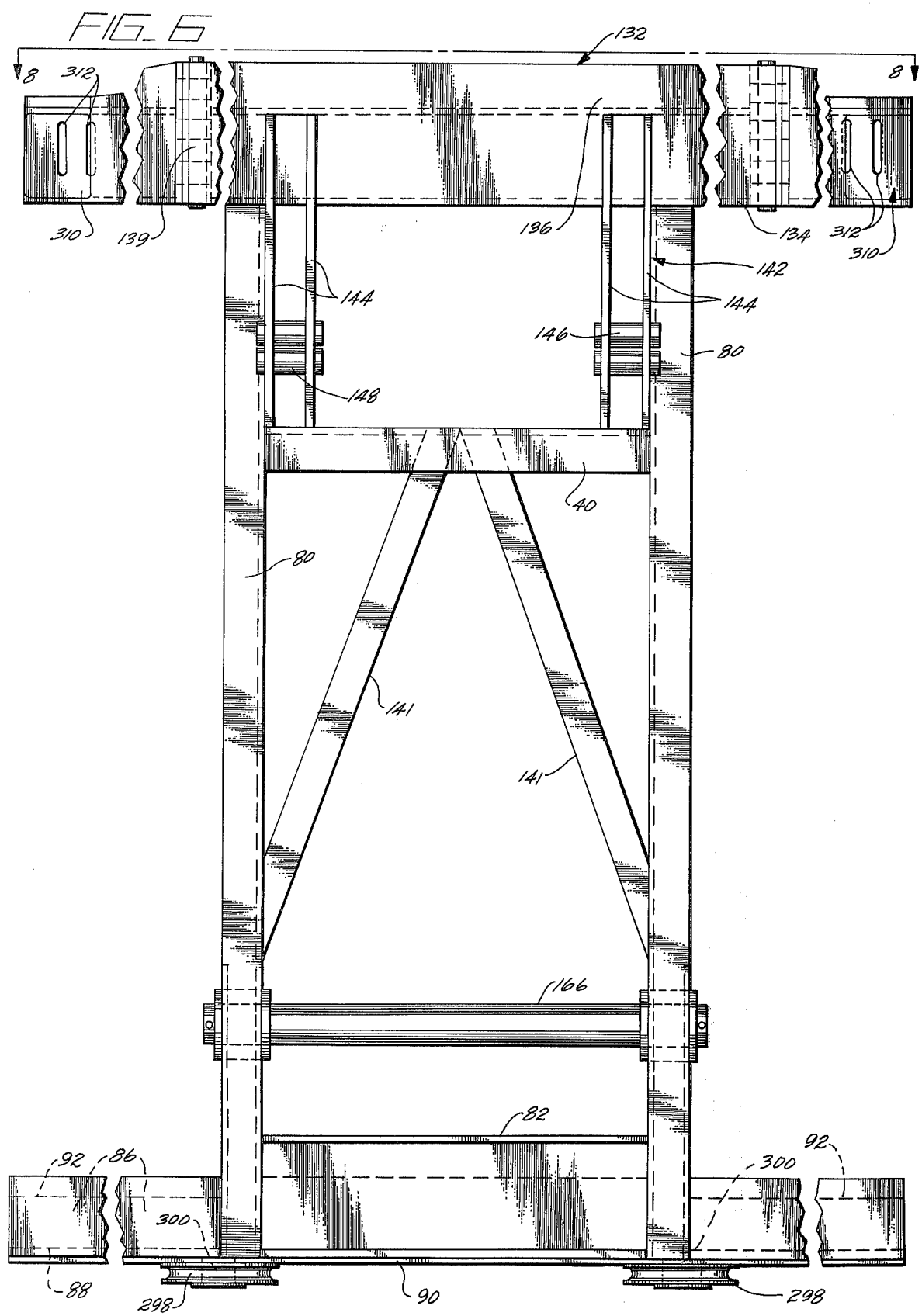

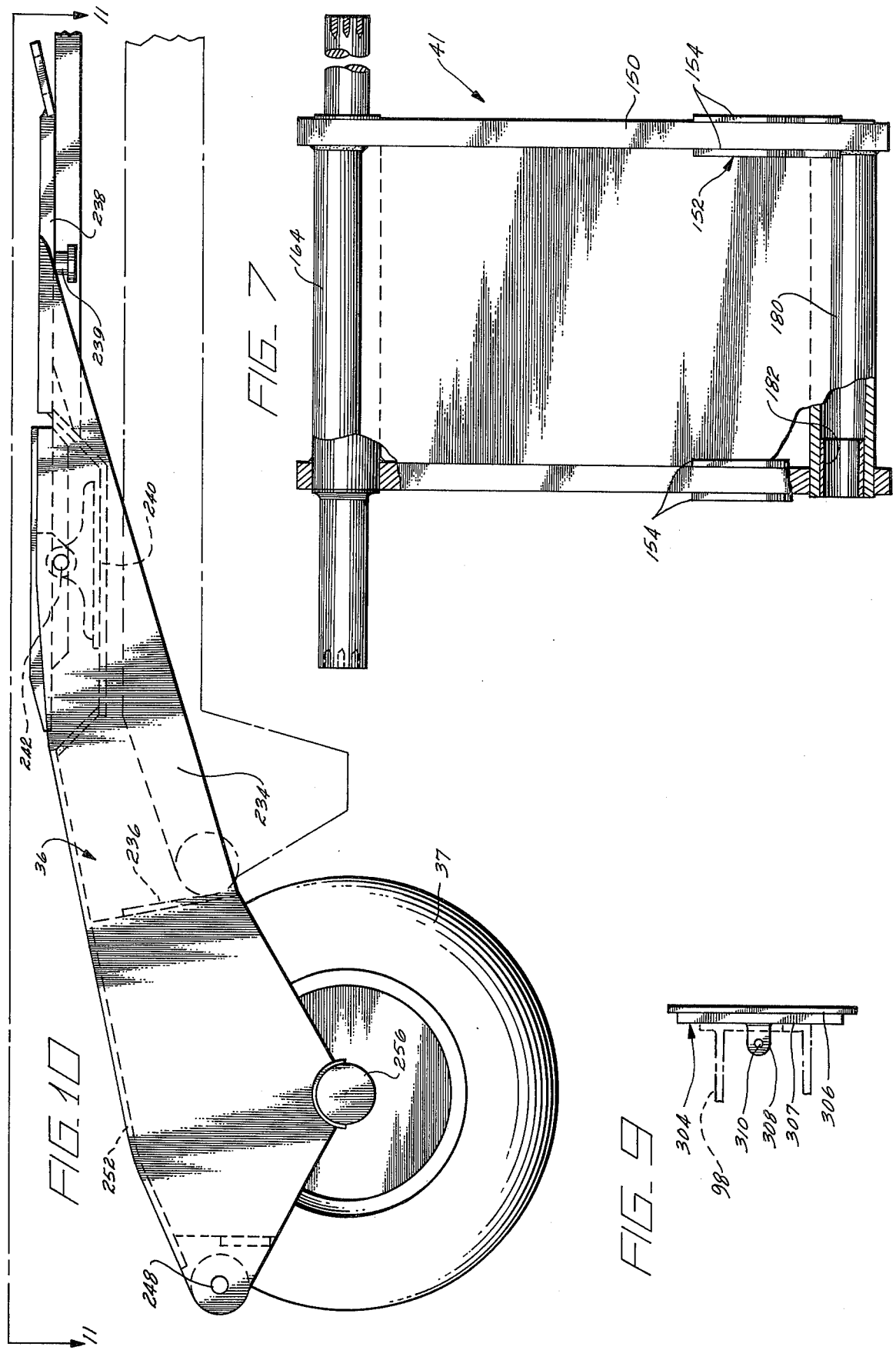

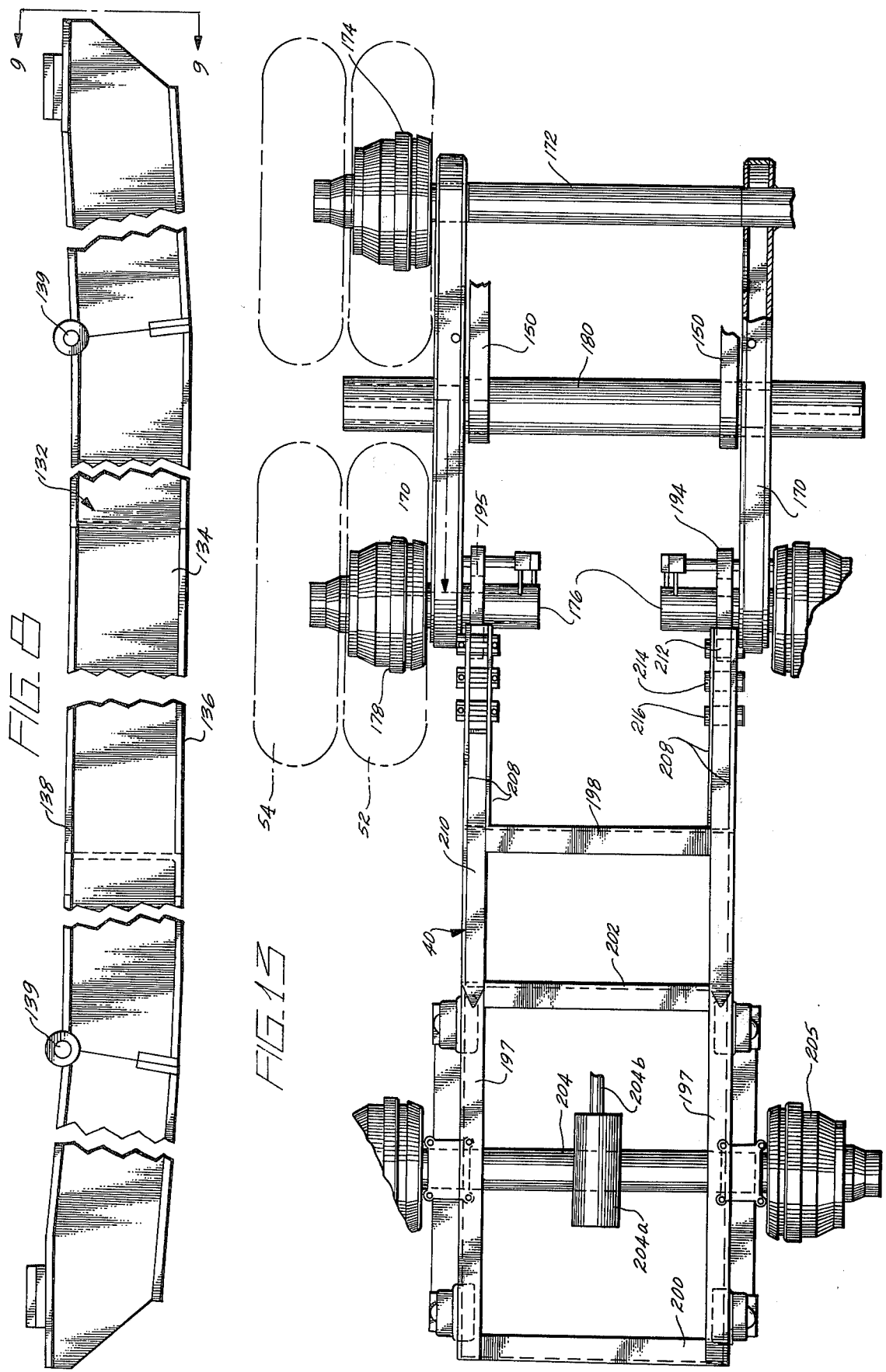

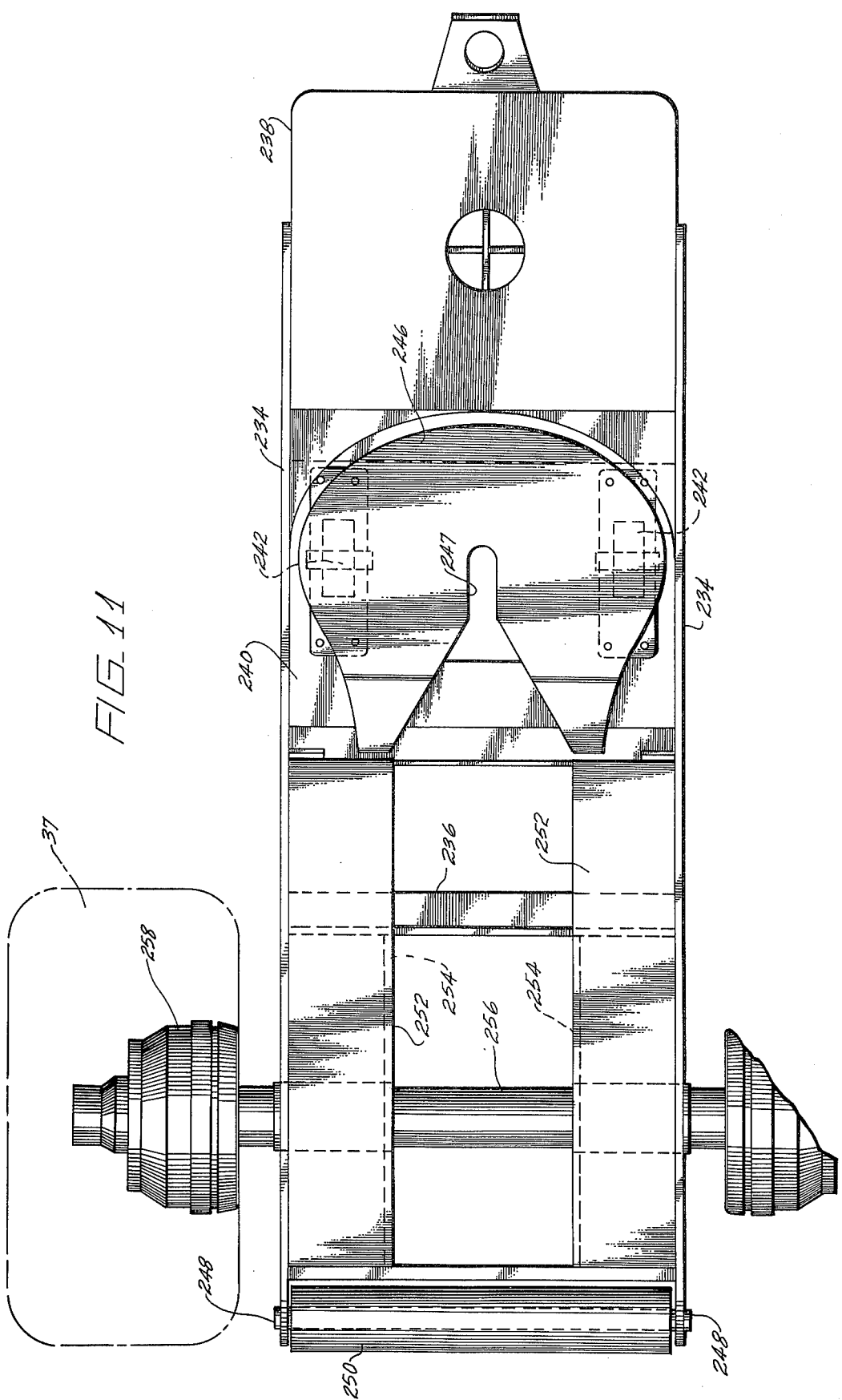

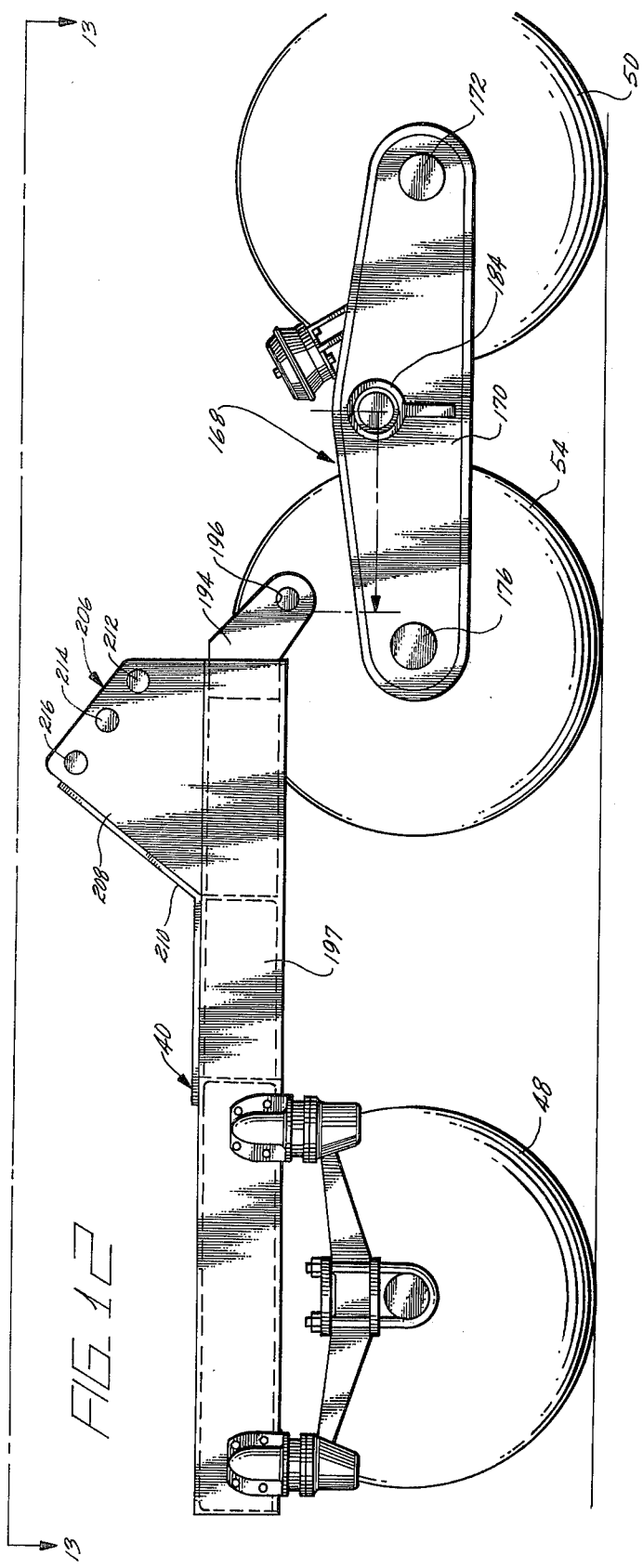
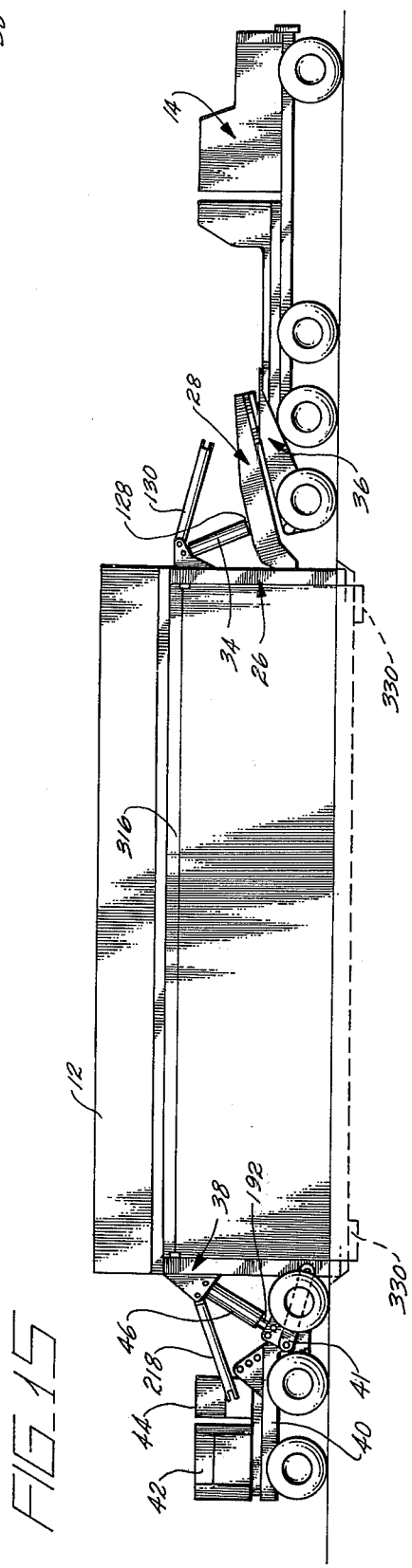

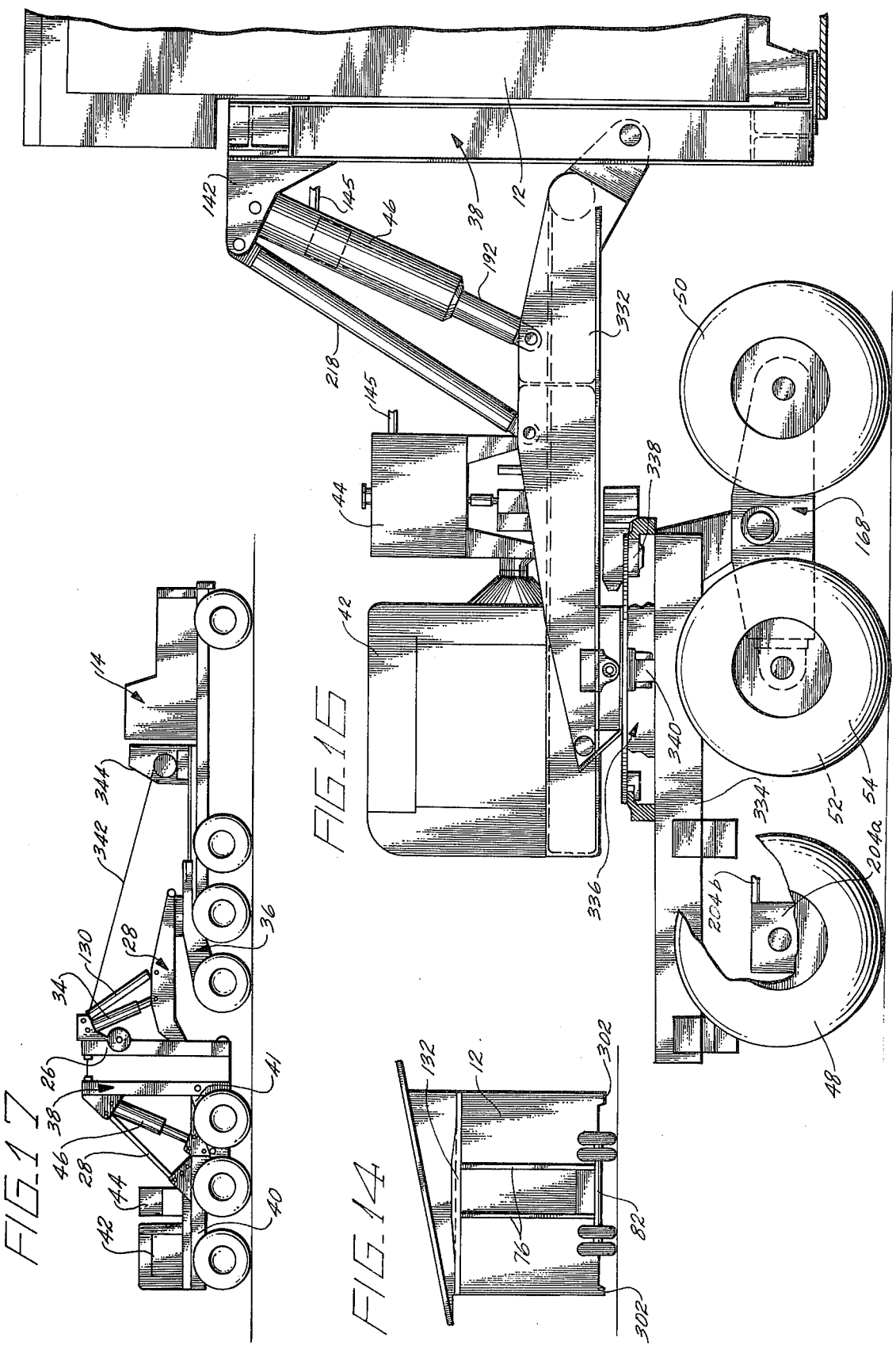

TRANSPORT RIG

CROSS-REFERENCE TO RELATED APPLICATION

This is a continuation-in-part of my copending application Ser. No. 164,524 filed Aug. 21, 1971 now abandoned.

BACKGROUND OF THE INVENTION

This invention relates to means for transporting heavy objects.

Precast concrete modular houses recently have been developed as a means for satisfying the need for low-cost housing. Concrete modules usually are precast at a casting site and then transported to the building site where they are assembled to form individual dwelling units. Some concrete modules weigh as much as 60 tons. If each module is transported by conventional means, such as a truck, a crane or the like is needed to lift the heavy module onto the truck bed. Most modules are in the neighborhood of 10 to 15 feet high. Thus, truck-mounted modules would be difficult to transport on major highways, because their height would interfere with overpasses and the like. However, at the building site the modules often are set on foundations below the level of the ground. Thus, when using the conventional transportation means it is necessary to lift the heavy module from the truck bed and position it properly on the foundation. This usually requires a second crane or the like at the building site.

SUMMARY OF THE INVENTION

This invention provides a transport rig for moving heavy loads, such as precast concrete modular houses. The transport rig lifts the load and carries it close to the ground. The transport rig eliminates the need for a crane to lift the load onto a truck bed or the like prior to the transport run. Moreover, the load may be carried so close to the ground, say about two inches above the level of the roadbed, that the top of the load does not interfere with overpasses and the like. When used for carrying precast concrete modular houses, the transport rig may be positioned directly onto the foundation at the building site and lowered onto the foundation. Thus, a crane is not needed at the building site for placing the modules on their foundations.

Briefly, the transport rig includes a front load support frame for carrying the front end of the load to be moved, and a rear load support frame carrying the rear end of the load. The object is held above the ground by separate frame support means mounted on respective sets of wheels and secured to the front and rear load support frames, respectively. Preferably, the front and rear load support frames are secured together so the transport rig and the load may be transported as a unit. Thus, the load support frames carry the load between them, with the bottom of a load being carried close to the ground during the transport run.

In a preferred form of the invention, each frame support includes one or more movable support arms, preferably hydraulic cylinders, which may be actuated to raise the load, or lower it to or below the level of the ground.

Preferably, the load support frames are secured tightly together by an elongated cable extending from one frame to the other. The cable is attached to a power-operated winch drum assembly and is arranged preferably in a closed loop between the two frames so that operation of the winch drum draws the cable to pull the frames tightly against the front and rear ends of the load. After the load is lowered to the vicinity of its desired position, the front and rear of the load can be shifted laterally to properly position the load above the foundation or other desired location. The cable then is disabled to free the load support frames so they can be separately removed from the load. Thereafter, the load support frames are coupled together for the return trip.

BRIEF DESCRIPTION OF THE DRAWINGS

FIG. 1 is a schematic elevation view showing a transport rig carrying a load;

FIG. 2 is a schematic plan view taken on line 2—2 of FIG. 1;

FIG. 3 is an elevation view of the front load support frame shown in FIG. 1;

FIG. 5 is an elevation view of the rear load support frame shown in FIG. 1;

FIG. 6 is an elevation view taken on line 6—6 of FIG. 5;

FIG. 7 is a plan view taken on line 7—7 of FIG. 5;

FIG. 8 is a plan view taken on line 8—8 of FIG. 5;

FIG. 9 is an elevation view taken on line 9—9 of FIG. 8;

FIG. 10 is an elevation view showing a chassis for supporting the front load support frame;

FIG. 11 is a plan view taken on line 11—11 of FIG. 10;

FIG. 12 is an elevation view showing a chassis for supporting the rear load support frame;

FIG. 13 is a plan view taken on line 13—13 of FIG. 12;

FIG. 14 is a schematic elevation view taken on line 14—14 of FIG. 1 showing a concrete module hoisted by the transport rig;

FIG. 15 is a schematic elevation view showing the transport rig lowering the module onto a foundation;

FIG. 16 is an elevation view showing a steerable rear chassis;

FIG. 17 is a schematic elevation view showing the transport rig in transit returning without the load;

DETAILED DESCRIPTION OF THE PREFERRED EMBODIMENTS

Figure 4:
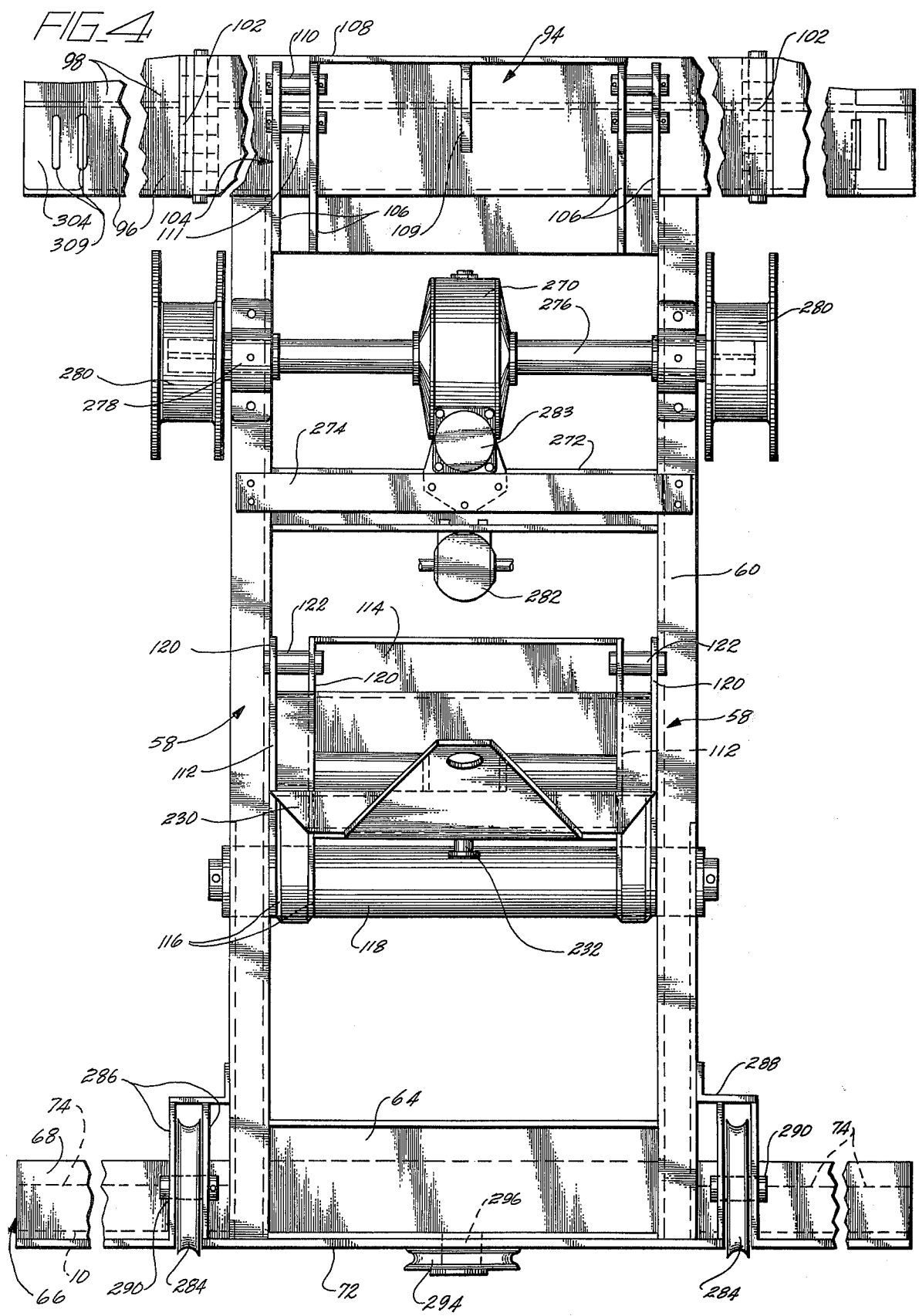
FIG. 4 is an elevation view taken on line 4—4 of FIG. 3.

Referring to FIGS. 1 and 2, a transport rig 10 carries a load 12 which, for the purposes of this description, is a concrete modular dwelling unit, although the transport rig is suitable for carrying other loads, particularly relatively heavy loads weighing as much as 60 tons, for example. The floor area of the modular unit is in the neighborhood of 37 feet by 13 feet, with the height at one end of the unit being about 10 feet, and the height at the other end being about 15 feet. The transport rig is towed by a highway tractor 14 having a cab 16 and a chassis 18. Preferably, the tractor is a two-axle type, with a front set of wheels 20 and a rear set of wheels 22.

The transport rig includes a front load support frame 24 which supports the front end of the load, and a rear load support frame 26 which supports the rear end of the load.

Front load support frame 24 includes an upright front skeleton frame 27 which fits under the front end of the load. A horizontal cantilevered front frame support or platform 28 is connected at its rear to front skeleton frame 27. The front platform carries a power unit 32 and a hydraulic oil reservoir 33 for operating a pair of rearwardly and upwardly extending hydraulic cylinders 34 which extend between the platform and the upper front portion of the skeleton frame.

A front wheel frame including a cantilevered chassis 36 below front platform 28 is supported on the ground by a set of wheels 37 and connected to the front platform to support the platform above the ground in a substantially horizontal position. The cantilevered chassis is connected at its front end to the rear of truck chassis 18.

Rear load support frame 26 includes an upright rear skeleton frame 28 which fits under the rear end of the load. A horizonal rear platform 40 is connected to rear skeleton frame 38 by a substantially horizontal, rearwardly extending cantilevered frame support or coupling frame 41. The rear platform carries a power unit 42, a hydraulic fluid reservoir 44, and a pair of elongated upwardly and forwardly extending hydraulic cylinders 46 operated by power unit 42. A rear wheel frame is provided by rear platform 40 which is supported above the ground by a rear set of wheels 48. The rear wheel frame also is provided by rear frame support 41 which is supported above the ground by a front set of wheels 50 and an intermediate set of wheels comprising a pair of hydraulic wheels 52 adjacent rear platform 40, and a pair of outer wheels 54, which are the conventional air inflated type, mounted on the same axle as hydraulic wheels 52.

Referring to FIGS. 3 and 4, front skeleton frame 27 includes a pair of laterally spaced apart front I-beam posts 58. For the purposes of carrying the concrete modular units described above, the I-beam posts 58 are spaced slightly greater than 3 feet apart. Each I-beam post is arranged so that one of its legs forms a vertically extending front edge 60 facing the truck, with the other leg forming a vertically extending rear edge 62 next to the load. I-beam posts 58 are braced at their bottoms by an elongated, horizontally extending I-beam 64 which is secured at its ends to the inner edges of the posts.

A horizontal, elongated L-shaped front load-supporting platform 66 is rigidly secured to the bottoms of I-beam posts 58. As shown best in FIG. 3, platform 66 has a vertically extending leg portion 68 which is rigidly secured at laterally spaced apart points to the rear edges 62 of I-beam posts 58. Platform 66 also includes a horizontal leg 70 extending toward the rear of the transport rig.

As shown best in FIG. 4, each end of platform 66 extends laterally outwardly, preferably about 2 feet, from the outer edge of a respective one of the I-beam posts. A flat, elongated, horizontal support plate 72 is rigidly secured between the bottoms of the I-beam posts to provide a lower support for horizontal leg 70 of platform 66. A pair of laterally spaced apart, upwardly opening, U-shaped front channel bars 74 are carried by the outer end portions of horizontal leg 70. The front channel bars fit around the front of the load in a manner described in detail below.

Referring to FIGS. 5 and 6, rear skeleton frame 38 includes a pair of laterally spaced apart rear I-beam posts 76 identical to posts 58. Each I-beam post 76 is arranged so that one of its legs form a vertically extending front edge 78 facing the load, with the other leg forming a vertically extending edge 80 facing the rear of the transport rig. I-beam posts 76 are braced at the bottom by a horizontal I-beam 82. An elongated, L-shaped rear load-supporting platform 84 has a vertical leg 86 rigidly secured to front edges 78 of rear I-beam posts 76. Rear platform 84 also has a horizontal leg 88 extending toward the front of the transport rig. Platform 84 is supported by a flat, elongated horizontal support plate 90 which is rigidly secured between the bottoms of I-beam posts 76. The outer ends of platform 84 preferably extend laterally outwardly from the sides of I-beam posts 76 the same distance that the ends of front platform 66 project outwardly from posts 58. The end portions of platform 84 carry respective upwardly opening, U-shaped, rear channel bars 92 which are identical to front channel bars 74.

Referring again to FIGS. 3 and 4, a horizontal front upper lateral brace beam 94 is rigidly secured to the tops of front I-beam posts 58. Each end portion of brace beam 94 extends laterally outwardly from the outer edge of its adjacent front post 58. Preferably, the ends of beam 94 extend slightly beyond the side of the load carried by the transport rig (see FIG. 14). In the case where the load comprises the modular unit 12, the ends of the front upper brace beam extend approximately 4½ feet outwardly from the outer edges of their respective posts 58.

Front upper brace beam 94 preferably is an elongated box beam 96, with an upwardly opening U-shaped channel formed at its top by upwardly extending front and rear legs 98 and 100 integral with the front and rear edges, respectively, of the box beam. Each end portion of front brace beam 94 is connected to a separate hinge 102 to permit the end portions to pivot about respective vertical axes through the hinges. This permits the end portions of the brace beam to swing back against the major portion of the beam to reduce the amount of overhang at the sides of the transport rig when it makes a return trip without the load.

A separate vertically disposed bracket 104 is rigidly secured to the front of horizontal brace beam 94 adjacent the inner edge of each post 58. Each bracket 104 comprises a pair of laterally spaced apart vertical plates 106 which extend outwardly from I-beam post 58 and brace beam 94 toward the front of the transport rig. An elongated horizontal plate 108 braces the tops of the innermost vertical plates 106. The horizontal plate is rigidly secured at its rear to the tops of legs 98 and 100, and is supported at its center by a vertical support bar 109 rigidly secured to the front of beam 94. Each bracket 104 carries a horizontally disposed strut support pin 110 at its front, and a horizontally disposed cylinder support pin 111 spaced to the rear of support pin 110.

Horizontal cantilevered front platform 28 is secured at its rear between I-beam posts 58 and extends away from skeleton frame 27 toward the front of the truck. Platform 28 includes a separate elongated forwardly extending horizontal box beam 112 closely spaced from the inner edge of each I-beam post 58. The box beams have suitable cross bracing such as a horizontally disposed I-beam 114.

A separate pair of laterally spaced apart downwardly and rearwardly extending plates 116 integral with the rear end portion of each box beam extend to a point closely spaced from the inner vertical edge of each I-beam post 58. A horizontally disposed, elongated, circular transverse tubing 118 carried by rear plates 116 pivotally secures platform 28 to the front skeleton frame 27. The end portions of tubing 118 extend laterally outwardly from rear plates 116 for attachment to respective central web portions of I-beam posts 58. The ends of tubing 118 are journaled in a pair of laterally spaced apart bushings (not shown) mounted in the rear plates 116 so that platform 28 pivots about a horizontal transverse axis through the center of tubing 118.

The side plates of each box beam 112 extend upwardly to define a pair of vertical legs 120 which carry a respective lower strut pin 122 and a respective lower cylinder support pin 124 to the rear of pin 122.

The pair of front hydraulic cylinders 34 extend upwardly and rearwardly from the sides of front platform 28 for connection with brackets 104. The top of each cylinder is secured to a respective one of pins 111. A movable piston 128 in the lower portion of each hydraulic cylinder is releasably secured to a respective one of pins 124.

A separate elongated tubular strut 130 in front of each hydraulic cylinder 34 extends upwardly and rearwardly from each side of platform 28 for connection with brackets 104. The upper end of each strut is secured to a respective one of pins 110, and the bottom of each strut is secured, such as by cotter keys (not shown) or the like, to a respective one of pins 122.

The rear skeleton frame 38 shown in FIGS. 5 through 8 includes a horizontal rear upper lateral brace beam 132 which is identical to front horizontal beam 94. Rear brace beam 132 is rigidly secured to the tops of rear posts 76, and comprises a box beam 134 with elongated upwardly extending rear and front legs 136 and 138, respectively, integral with its rear and front edges, respectively. Rear brace beam 132 preferably extends outwardly from I-beam posts 76 the same distance that the ends of front brace beam 94 extend outwardly from posts 58. Each end portion of horizontal rear beam 132 is connected to a separate hinge 139 so the end portions of the rear brace beam pivot about respective vertical axes through the hinges.

Rear I-beam posts 76 are braced by a horizontal cross beam 140 secured at its ends to respective inner edges 80 of posts 76. A pair of upwardly converging upright elongated braces 141 are rigidly secured at their bottoms to the respective inner edges 80 of posts 76. The tops of the braces are rigidly secured to the bottom of cross beam 140.

A pair of laterally spaced apart rearwardly extending vertically disposed brackets 144 are secured to the upper portion of rear skeleton frame 38, each bracket being rigidly secured to a respective inner edge 80 of each I-beam post 76. Each bracket 144 carries a horizontally disposed strut support pin 146 at its rear, and a horizontally disposed cylinder support pin 148 spaced forwardly (with respect to the transport rig) of support pin 146.

Horizontal cantilevered rear coupling frame 41 comprises a pair of laterally spaced apart, rearwardly extending and substantially horizontal, elongated pivot beams 150 which are preferably rounded at their front and rear ends. The rear portion of each pivot beam 150 carries a separate upright bracket 152 comprising a pair of laterally spaced apart vertical plates 154 rigidly secured to the sides of the pivot beam 150. Each pair of plates 154 carries a separate horizontal pin 156 which fits through a pair of opposed holes 158 extending through the front of plates 154 along a common horizontal axis. Each pair of plates 154 also have a pair of cooperating holes 160 on a common horizontal axis behind holes 150, and a pair of cooperating holes 162 on a common horizontal axis below and to the rear of holes 160.

The front ends of pivot beams 150 are braced by a horizontally disposed, transversely circular, elongated hollow tubing 164 which makes a loose fit around an elongated horizontal steel shaft 166 which in turn is releasably secured between the lower portions of I-beam posts 76. The front end of each beam 150 is journaled in a respective bushing (not shown) mounted on a respective end of steel shaft 166 which permits the front end of rear load support frame 41 to pivot about a horizontal transverse axis through shaft 166.

As shown best in FIGS. 1, 12 and 13, the rear end of load support frame 41 is connected to a frame 168 which in turn is mounted above the ground on wheels 50, 52, and 54. Frame 168 includes a pair of laterally spaced apart, horizontal, elongated beams 170 which carry an elongated tubular axle 172 at their fronts for mounting wheels 50 and their respective brake drums 174. A separate axle shaft 176 at the rear end of each beam 170 mounts a respective one of the hydraulic wheels 51, its neighboring outer wheel 54, and a respective brake drum 178 for each hydraulic wheel.

Referring to FIG. 7, the rear portion of coupling frame 41 includes an elongated transverse tubular axle shaft 180 extending between beams 150. Each end of axle shaft 180 is journaled in a separate bushing 182 mounted on an elongated transverse axle shaft 184 (see FIG. 12) extending between intermediate portions of wheel frame beams 170. This mounting of the rear of coupling frame 41 to wheel frame 168 permits the rear of the coupling frame to pivot about a horizontal transverse axis through axle shaft 184.

The pair of rear hydraulic cylinders 46 extend upwardly and forwardly from brackets 152 on coupling frame 41 to respective ones of the brackets 144 at the top of rear I-beam posts 76. The top of each hydraulic cylinder is secured to a respective one of the pins 148 carried by bracket 144. A separate movable piston 192 in each cylinder is releasably secured at its bottom to a respective one of the pins 156. A pair of hydraulic lines 145 deliver hydraulic fluid under pressure between hydraulic reservoir 44 and the hydraulic cylinders 46. The angular position of each hydraulic cylinder 46 may be changed by removing each pin 156 from its respective hole 158 and mounting each pin in a respective one of the holes 160 of each bracket 152. The lower end of the piston is then releasably secured to the pin such as by a cotter pin (not shown) or the like.

As shown best in FIGS. 1, 12 and 13, the front end of rear platform 40 carries a pair of side plates 194 which are coupled to brackets 152. Each side plate 194 fits between plates 154 of bracket 152, and a respective pin 195 extends through a hole 196 in each plate 194 and through the matching holes 162 at the rear of plates 154 to couple the rear platform to coupling frame 41. The true position of wheel frame 168 with respect to rear platform 40 is shown in FIG. 1, not FIGS. 12 and 13. The latter figures show the wheel frame moved forward from under platform 40 for clarity. In use, wheel frame 168 is moved rearwardly to the position illustrated by the arrows in FIGS. 12 and 13.

Platform 40 includes a horizontally disposed chassis formed from a pair of laterally spaced apart elongated side beams 197 which are braced respectively by a front cross beam 198, a rear cross beam 200, and an intermediate cross beam 202. The rear portion of beams 197 carry an elongated transverse axle shaft 204 which mounts rear wheels 48. Preferably rear platform 40 is movable relative to load 12. Various means may be used to drive the rear platform. A typical arrangement is shown in FIGS. 2, 13 and 16 in which a hydraulic power take-off 204a from hydraulic unit 44 is coupled to rear axle shaft 204. The power take-off 204a receives hydraulic fluid from hydraulic line 145 via a hydraulic line 204b controlled by a valve 204c. Axle shaft 204 also carries a separate brake drum 205 for each rear wheel 48.

A pair of laterally spaced apart, upwardly extending brackets 206 are secured to the front end of platform 40. Each bracket includes a pair of laterally spaced apart vertical plates 208 rigidly secured to the sides of each beam 197. The rear upper portion of each pair of plates 208 is braced by an elongated, transverse angular brace bar 210 (not shown in FIG. 13) which is rigidly secured at its front end over the rear portions of plates 208, the rear portion of the brace bar being rigidly secured to side beams 197. Each bracket 206 carries a horizontally disposed strut support pin 212 at its front, a second horizontally disposed strut support pin 214 at a point spaced rearwardly from pin 212, and a third horizontally disposed strut support pin 216 spaced to the rear of pin 214. A pair of elongated tubular struts 218 (see FIG. 5) extend forwardly and upwardly from bracket 206 for attachment to the pins 146 in rear upper mounting bracket 142. The lower end of strut 218 is formed as a downwardly opening U-shaped fitting 220 which fits over any one of the three pins 212, 214, or 216 on bracket 206, depending upon the desired angular orientation of the strut. A key 222 secures the lower end of the strut to one of the pins.

As shown best in FIG. 3, a downwardly projecting horizontal box beam 230 which extends the width of horizontal front platform 28 is rigidly secured to the underside of beams 112. Box beam 230 carries a downwardly projecting hitch 232 at its center which is adapted for attachment to front horizontal chassis 36 which in turn is coupled to the rear of truck chassis 18. As shown best in FIGS. 10 and 11, chassis 36 includes a pair of laterally spaced apart, vertically extending side plates 234 which are braced by an intermediate cross bar 236. A horizontal front platform 238 is rigidly secured between the front portions of side plates 234. A hitch 239 projects downwardly from the underside of platform 238. Hitch 239 is adapted for connection to truck chassis 18 and provides the rotation point between the truck chassis and the transport rig. Immediately behind platform 238 is a horizontally disposed, recessed platform 240 secured behind side plates 234. A pair of laterally spaced apart bearings 242 mounted on recessed platform 240 pivotally mount a saddle-shaped coupling member 246 to the upper portion of chassis 36. Coupling member 246 has a rearwardly opening slot 247 which is adapted to receive hitch 232 for connecting the front of platform 28 to chassis 36. In use, pivotal movement of platform 28 about the axis through shaft 118 causes coupling member 246 to pivot about a horizontal transverse axis through bearings 240. The rear ends of side plates 234 are braced by a shaft 248 extending between them. Shaft 248 mounts a roller 250 between side plates 234.

A pair of laterally spaced apart, rearwardly extending horizontal plates 252 rest on cross bar 236 and are secured at their outer longitudinal edges to the inner edges of side plates 234. A separate downwardly extending vertical plate 254 is rigidly secured to the inner edge of each horizontal plate 234. An elongated transverse horizontal axle shaft 256 is mounted for rotation by side plates 234 and their cooperating vertical plates 254. Axle shaft 256 mounts wheels 37 and a respective brake drum 258 for each wheel.

Referring to FIGS. 3 and 4, a power-operated winch 270 is mounted on the front side of front skeleton frame 27 between front I-beam posts 58. The winch is mounted on a horizontal transverse plate 272 which extends between the front posts and is held in place by a vertically disposed transverse cross bar 274 connected between the front posts. A horizontal, transverse, elongated rotary driven shaft 276, which is driven by the winch, is mounted near its ends in bearings 278 which in turn are rigidly secured to the front edges 60 of front posts 58. Each end of shaft 276 extends laterally outwardly from a respective one of the posts 58 and carries a respective winch drum 280 which is spaced close to the outer edge of the adjacent front post. Drum 280 is not shown in FIG. 3 for clarity. A drive motor 282 mounted below the winch between front posts 58 is adapted by suitable means to drive the winch to rotate shaft 276 and drums 280 about a horizontal transverse axis through the winch. A brake 283 is applied by suitable means to stop rotation of the winch.

A pair of lower sheaves 284 mounted at the bottom of front skeleton frame 27 adjacent the outer edges of posts 58 are aligned vertically with drums 280. Each lower sheave 284 is mounted in a housing comprising a pair of laterally spaced apart vertical side plates 286, the bottoms of which are mounted on horizontal plate 72. A separate horizontal angle bar 288 rigidly secures the tops of each pair of side plates to the outer edge of a respective one of the front posts 58. A separate horizontal transverse axle shaft 290 is journaled in a bearing (not shown) which in turn is mounted to the side plates to rotate each sheave 284 about a horizontal transverse axis through axis shaft 290.

A horizontally disposed sheave 294 is mounted below front skeleton frame 26 in the center of bottom horizontal plate 72. The sheave is journaled in a bearing 296 which in turn is rigidly secured to plate 72 to rotate the sheave about a vertical axis along the center line of the front skeleton frame.

Referring to FIGS. 5 and 6, a pair of laterally spaced apart, horizontally disposed rear sheaves 298 are journaled in bearings 300 which in turn are mounted in rear bottom plate 90 adjacent rear I-beam posts 76.

The use of the winch and sheave arrangement will be described in detail below.

In using the transport rig, bottom platform 70 of front skeleton frame 27 is initially placed under the front of the load, and bottom platform 88 of the rear skeleton frame 38 is placed under the rear of the load. As shown best in FIG. 14, the modular unit 12 has downwardly projecting beams or skirts 302 which extend around its outer perimeter. The longitudinally extending skirts are longer than the skirts at the ends of the module and therefore rest on the foundation (not shown) when the module is placed in its proper position at the building site. Thus, the skirts form an open space between the ground and the bottom of the module at both the front and rear ends of the module. The bottom front and rear load-carrying platforms 70 and 88 fit in these openings at the front and rear of the module, respectively, so the front and rear skeleton frames may lift the front and rear of the load. As shown best in FIG. 1, a downwardly projecting bottom edge 302 at the front of the modular unit rests in front channel bars 74 during lifting, and an identical downwardly projecting bottom edge 303 at the rear of the modular unit rests in rear channel bars 92 during lifting.

The front skeleton frame is placed in position for lifting by detaching the bottom of front tubular strut 130 from front platform 28 and actuating the front hydraulic cylinders 34 to slide pistons 128 up into the cylinders. This movement of the cylinders causes the rear end of front platform 28 to move down and pivot the platform about its connection to the front chassis 36 so the front platform in effect pivots in a counterclockwise direction as viewed in FIG. 1. Continued retraction of the cylinders moves load-carrying platform 70 of the front skeleton frame closer to the ground until the platform is in a position to fit into the open space between the bottom of the modular unit and the ground.

Similarly, rear tubular struts 218 are disconnected from brackets 206 and rear hydraulic cylinders 46 are actuated to retract pistons 192 and lower the rear skeleton frame 38 so rear platform 88 fits into the open space at the rear of the modular unit. The hydraulic drive of the rear platform makes the rear platform an individual mobile unit and thereby permits easy positioning of the rear skeleton frame under the load.

The front skeleton frame is moved under the front of the load so the posts 58 are spaced a short distance from the load. As shown best in FIG. 9, a separate front wall shoe 304 is secured to the end of each front upper horizontal beam 96. Each wall shoe preferably comprises a pair of flat plates 306 and 307 which are rigidly secured together, with a rearwardly projecting eye 308 mounted on plate 307. A pair of upright laterally spaced apart slots 309 (see FIG. 4) are formed in the end of each front upper horizontal beam 98. Each wall shoe 304 is mounted on the end of beam 98 by inserting eye 308 in one of the two slots 309 so that an aperture 310 formed in the eye is positioned on the rear side of beam 98, as shown best in FIG. 9.

An identical pair of rear wall shoes 311 (see FIG. 1) are mounted in identical cooperating pairs of upright slots 312 in the ends of rear upper horizontal beam 132. Rubber pads 314 are placed in the space between the rear sides of the front and rear upper horizontal beams and the front and rear walls, respectively, of the modular unit. Thus, the front and rear skeleton frames are held tightly against the front and rear, respectively, of the unit.

Each outer end of upper front horizontal beam 94 is rigidly tied to a respective outer end of each upper rear horizontal beam 132 by a separate elongated cable 316 (see FIG. 1) extending along each side of the modular unit. The front and rear ends of cables 316 are secured to the eyes of the front and rear wall shoes 304 and 310, respectively. The cable 316 is tightened by a manually operated tension adjusting drum 318 mounted near rear post 38.

The front and rear skeleton frames are rigidly connected to each other at their bottoms by an elongated tension line or cable 320 which is secured at its ends to winch drums 280. Tension line 320 is payed out from the winch drums so the line extends downwardly from each drum around a respective bottom sheave 284 and rearwardly under the modular unit around a respective rear bottom sheave 298, with the center portion of the cable extending forwardly again under the unit and around sheave 294, thus forming a closed loop. The front and rear skeleton frames may be drawn tightly together against the front and rear ends of the modular unit by driving winch 270 to apply tension to the closed-loop tension line 320.

Additional rigidity is added by fastening each front corner of the modular unit to a respective side of front horizontal beam 66, and rigidly securing each rear corner of the modular unit to a respective side of rear horizontal beam 86. This is preferably accomplished by a pair of elongated front eyebolts 322 (see FIG. 1) which connect the front corners of the modular unit to the front beam, and a pair of elongated rear eyebolts 324 which rigidly connect the rear corners of the unit to the rear beam. The rear end of each front eyebolt 322 is rigidly connected to a respective elongated horizontal fitting 326 which is rigidly secured to a respective skirt 302 of the modular unit. Similarly, the front end of each rear eyebolt 234 is rigidly connected to an elongated horizontal fitting 328 which in turn is rigidly secured to a respective skirt of the modular unit.

After the load is rigidly secured to the front and rear skeleton frames, the front and rear hydraulic cylinders are actuated to extend their respective pistons downwardly and lift the modular unit to a load-carrying position illustrated best in FIG. 1. In this position, the modular unit preferably is carried about one foot above the ground. After the desired load-carrying position is attained, the front and rear tubular struts 130 and 218 are connected to the front and rear platforms respectively to provide additional rigidity for the load during transit.

On the trip to the building site, it may be necessary to drive the load under an overpass, or over a raised portion of the road, such as a railroad trestle. In these instances, the hydraulic cylinders may be actuated to either lower or raise the load accordingly.

In the case where the transport rig carries the modular units 12 to a building site, each unit is set on a foundation 330 (see FIG. 15). The foundation is shown below the level of the ground, although the foundation could be above ground also. In either case, the transport rig is adapted to quickly and easily place the modular unit on the foundation.

During unloading operations, tractor 14 is steered so as to maneuver the front end of the load into place over the foundation. In some cases, it is desirable for the rear trailer section to be self-propelled and steerable so the rear end of the load may be maneuvered into a given position. In these cases, the self-propelled and steerable rear trailer section shown in FIG. 16 may be used. This form of the transport rig includes a horizontal rear platform 332 pivotally mounted at its front to rear I-beam posts 38. Rear hydraulic cylinders 46 and tubular struts 218 are mounted at their bottoms to the sides of platform 332. A steerable rear platform 334 carries a conventional steering mechanism 336 which includes a rack and pinion at 338. The rear portion of steerable platform 334 is mounted above the ground on rear set of wheels 48. Wheel frame 168, which carries wheels 50, 52, and 54, is coupled to the front of platform 334. Steering mechanism 336 is connected between the steerable platform and stationary rear platform 332. The steering mechanism allows steerable platform 334 to rotate about a vertical axis through a bearing 340. The platform is steered by a suitable steering mechanism (not shown) engaged with steering axle 204 to rotate wheels 48 so the rear power unit can maneuver the rear end of the load into its desired position. Hydraulic wheels 52 preferably are coupled to a cam-operated engaging and disengaging mechanism (not shown) which can be engaged to drive the hydraulic wheels when extra traction is needed to move the rear power unit into place.

FIG. 15 shows the transport rig in use lowering the modular unit at the building site after the front and rear ends of the load have been maneuvered into a position above foundation 330. In the example shown in FIG. 15, the modular unit is lowered by detaching the bottoms of the front and rear struts 130 and 218, respectively, and then actuating front and rear hydraulic cylinders 34 and 46 to contract their respective pistons 128 and 192 so the front platform 28 and rear coupling frame 41 pivot down to lower the modular unit toward the foundation.

In many instances it is difficult for the operator of the transport rig to position both the front and rear ends of the load directly above a foundation by maneuvering the front and rear power units of the transport rig. The present invention provides means for shifting the load laterally either to the right or to the left of the longitudinal axis of the front and rear wheel frames so that both the front and rear ends of the load can be positioned immediately above a foundation before the load is lowered onto it.

Figure 18:
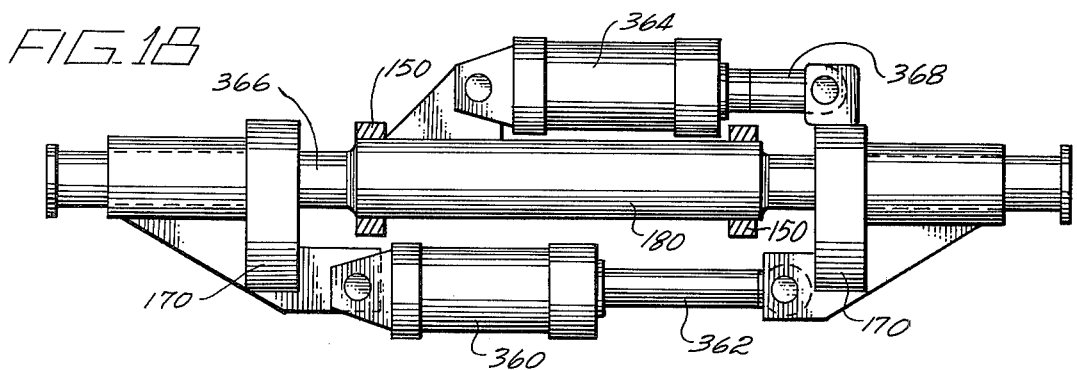
FIG. 18 is a cross-sectional elevation view showing a lateral shift mechanism for the rear load support frame of the transport rig.
Figure 19:
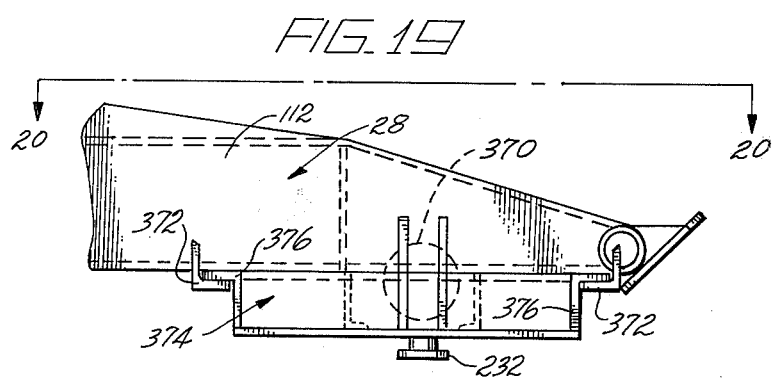
FIG. 19 is a fragmentary elevation view showing a lateral shifting mechanism for the front load support frame of the transport rig.
Figure 20:
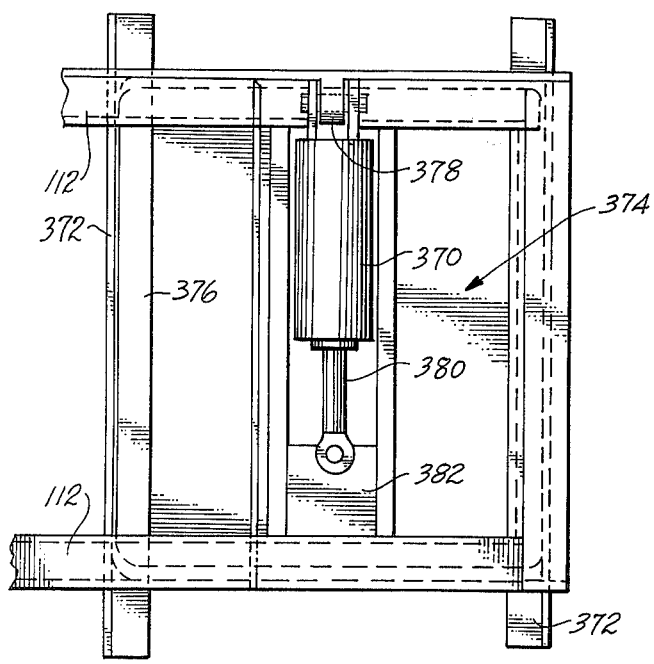
FIG. 20 is a fragmentary plan view taken on line 20—20 of FIG. 19.

The lateral shifting of the load is provided by a rear load shift mechanism shown in FIG. 18 and a front load shift mechanism shown in FIGS. 19 and 20. Referring to FIG. 18, the rear load shift mechanism includes a laterally extending hydraulic spreading cylinder 360 extending laterally between wheel frame beams 170. The cylinder housing of the spreading cylinder is rigidly fixed to one wheel frame beam, and an extendible and contractible piston 362 of the cylinder is connected to the other wheel frame beam.

During use of the rear lateral shifting mechanism, wheel frame beams 170 are initially spread apart by spreading cylinder 360 to the position shown in FIG. 18 in preparation for laterally shifting the rear end of the load. Preferably, the rear wheels of the rear power unit are spread apart by the spreading cylinder while the transport rig is running on the highway as it nears the vicinity of where the load will be placed.

In the transport rig shown in the drawings, the spreading cylinder spreads each beam 170 about five inches away from pivot beams 150. After beams 170 are spread apart, a laterally extending hydraulic shift cylinder 364 is actuated to shift rear load support frame 41 sideways along an axle 336 disposed in axle shaft 180. An end of the shift cylinder housing is rigidly secured to an end of tubular axle shaft 180, and an extendible and contractible piston 368 of the shift cylinder is rigidly secured to one of the beams 170.

In use, the rear load support frame 41 can be shifted up to five inches to the right in FIG. 18 by retracting piston 368, or the rear load support frame can be shifted up to five inches to the left in FIG. 18 by extending piston 368. In either instance, the spread apart beams 170 of the rear load support frame act as a thrust-base for movement of the shift cylinder piston.

Referring to FIGS. 19 and 20, the front lateral shift arrangement includes a laterally extending hydraulic front shift cylinder 370 for sliding front load support frame 28 laterally relative to front wheel frame 36. A pair of longitudinally spaced apart, laterally extending, C-shaped angle bars 372 are rigidly fixed to beams 112 of front load support frame 28. Hitch 232 is engaged with front wheel frame 36 and holds a laterally extending frame 374 fixed to front wheel frame 36. Beams 112 of the front load support frame 28 are engaged with cooperating L-shaped angle bars 376 of frame 374 in a slide mounting which allows beams 112 to slide laterally in either direction relative to angle bars 376 and therefore relative to front wheel frame 36. A coupling 378 rigidly secures the housing of front shift cylinder 370 to one end of fixed frame 374. A laterally extendible and contractible piston 380 of the shift cylinder is fixed to a plate 382 which, in turn, is rigidly fixed to one of the beams 112 of front load support frame 28.

In use, piston 380 can be extended or contracted to shift front load support frame 28 about 5 inches to either the left or right, respectively, in FIG. 20 to provide a corresponding lateral movement of the front end of the load.

Figure 21:
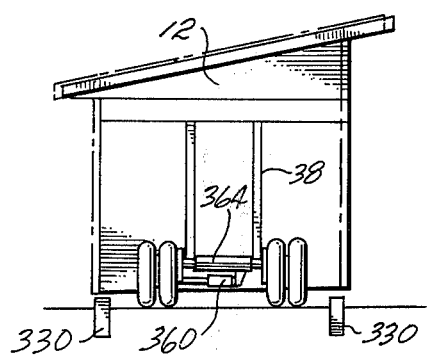
FIG. 21 is a schematic elevation view illustrating the use of the lateral shifting mechanism when mounting a concrete module on a foundation.

Thus, as shown best in FIG. 21, concrete module 12 can be shifted from an off-center position (shown in solid lines in FIG. 21) to an on-center position above a foundation 330 simply by an appropriate movement of the front or rear shift cylinders. Once the module is properly aligned above the foundation, the module then can be lowered onto the foundation so the lower peripheral skirts 302 of the module properly rest on the top of the foundation.

The transport rig is then removed from the front and rear ends of the foundation by disconnecting upper cables 316 and lower tension line 320 to free front and rear skeleton frames 26 and 38 from each other. The front and rear skeleton frames are then removed from the module units separately, the rear platform section being driven with the assistance of the rear hydraulic power take-off 204a. The drive for the rear platform also provides extra traction to get into difficult sites or climb inclined ramps.

After removal, the front and rear skeleton frames are raised to their usual load-carrying positions by pressurizing the front and rear hydraulic cylinders to raise the front and rear skeleton frames above the level of the ground. The skeleton frames then are connected together as shown in FIG. 17 for the return trip. The bottom tension line 320 is reconnected to its respective sheaves and wound up tight to draw the rear trailer section and rear skeleton frame tightly against the front skeleton frame. The tops of the skeleton frames are tied to each other by a tension line 342 running from a drum 344 at the rear of the tractor. The outer ends of upper horizontal front and rear beams 94 and 132 are then swung back about their respective hinges 102 and 139 to reduce the overhang of the transport rig during its return trip.

I claim:

1. A transport rig for moving a load having a first and a second end, the transport rig comprising a first load support frame having means on it for carrying the first end of the load, a second load support frame having means on it for carrying the second end of the load, a first wheel frame for supporting a first set of wheels resting on the ground forward of the first load support frame, a first frame support attached to the first wheel frame and extending toward the load for pivotal attachment to the first load support frame so as to maintain the carrying means of the first load support frame above the ground and so that the first frame support is able to pivot about a substantially horizontal axis through its point of attachment to the first load support frame, a second wheel frame for supporting a second set of wheels resting on the ground behind the second load support frame, a second frame support attached to the second wheel frame and extending toward the load for pivotal attachment to the second load support frame so as to maintain the carrying means of the second load support frame above the ground and so that the second frame support is able to pivot about a substantially horizontal axis through its point of attachment to the second load support frame, an extendible and contractible first actuating arm extending from the first load support frame to a point on the first frame support spaced from the support's point of attachment to the first load support frame, the first actuating arm being operative to pivot the first frame support about its horizontal axis to raise or lower the first end of the load, an extendible and contractible second actuating arm extending from the second load support frame to a point on the second frame support spaced from the support's point of attachment to the second load support frame, the second actuating arm being operative to pivot the second frame support about its horizontal axis to raise or lower the second end of the load, and means for securing the first and second load support frames together comprising an elongated flexible cable engaged with tension adjusting means on the first load support frame for paying out or reeling in the cable, the cable extending from the tension adjusting means directly into engagement with guide means on the first load support frame independently of the first wheel support frame or the first frame support means and then to a point of attachment on the second load support frame independently of engagement with the second wheel support frame of the second frame support means so that the adjustment of the tension adjusting means can shorten the effective length of the cable to squeeze the first and second ends of the load between the first and second load support frames, respectively, and so that raising or lowering of the load can be done independently of the adjustment of the tension in the cable, whereby the transport rig and the load may be transported as a unit under power supplied by a towing vehicle coupled to either of the wheel support frames.

2. Apparatus according to claim 1 in which the first load support frame includes securing means shaped to fit around a portion of the first end of the load, and in which the second load support frame includes securing means shaped to fit around a portion of the second end of the load independently of the securing means at the other end of the load so that the two end portions of the load are carried independently of each other by their respective load support frames.

3. Apparatus according to claim 1 in which each actuating arm comprises a hydraulic cylinder, and further including a first platform provided by the first wheel support frame, a second platform provided by the second wheel support frame, and in which the two platforms carry respective fluid drive means for actuating the hydraulic cylinders at their respective ends of the transport rig.

4. Apparatus according to claim 1 including means for steering the first wheel support frame, and means for steering the second wheel support frame independently of the other wheel support frame.

5. Apparatus according to claim 1 including means for laterally shifting the first frame support means relative to the first set of wheels and for laterally shifting the second frame support means relative to the second set of wheels.

6. Apparatus according to claim 5 in which the lateral shifting means shifts the frame support means either to the left or to the right of the longitudinal axes of the first and second wheel support frames.

7. Apparatus according to claim 5 including separate means for laterally shifting the first and second frame support means, and in which each lateral shifting means comprises a separate laterally extendible and contractible actuating arm rigidly secured to a corresponding wheel support frame, with each movable actuating arm being secured to a corresponding load support frame so that each wheel support frame acts as a thrust-base for lateral movement of its corresponding actuating arm.

8. A transport rig for moving a load having a first and a second end, the transport rig comprising a first load support frame having means on it for carrying the first end of the load, a second load support frame having means on it for carrying the second end of the load, A first frame support means having opposite sides for being supported by a first set of laterally spaced apart wheels resting on the ground adjacent the first load support frame, a portion of the first frame support means extending toward the load for pivotal attachment to the first load support frame so as to maintain the carrying means of the first load support frame above the ground and so that the first frame support means pivots about a substantially horizontal axis through its point of attachment to the first load support frame, a second frame support means for being engaged with a second set of wheels resting on the ground adjacent the second load support frame, a portion of the second frame support means extending toward the load for pivotal attachment to the second load support frame so as to maintain the carrying means of the second load support frame above the ground and so that the second frame support means pivots about a substantially horizontal axis through its point of attachment to the second load support frame, whereby the transport rig and the load may be transported as a unit under power supplied by a towing vehicle coupled to one of the two frame support means, an extendible and contractible first actuating arm extending from the first load support frame to a point on the first frame support means spaced from the support's point of attachment to the first load support frame means, the first actuating arm being operative to pivot the first frame support means about said horizontal axis to raise or lower the first end of the load, an extendible and contractible second actuating arm extending from the second load support frame to a point on the second frame support means spaced from the support's point of attachment to the second load support frame means, the second actuating arm being operative to pivot the second frame support means about said horizontal axis to raise or lower the second end of the load, means for moving the opposite sides of the first frame support means laterally away from each other to widen the lateral distance between the wheels on opposite sides of the first frame support means, means mounted on the first frame support means for shifting the first load support frame in a lateral direction relative to said first set of wheels after the distance between the wheels on the support frame is widened, and means mounted on the second frame support means for shifting the second load support frame in a lateral direction relative to a second set of wheels engaged with the second frame support means.

9. Apparatus according to claim 8 in which the first frame support means comprises a first wheel frame supported by said first set of wheels, and a first frame support means pivotally attached to the first wheel frame and extending to the load for said pivotal attachment to the first load support frame, and in which the second frame support means comprises a second wheel frame for supporting said second set of wheels, and a second frame support means pivotally attached to the second wheel frame and extending to the load for said pivotal attachment to the second load support frame, a first lateral shifting means extending between the first wheel frame and the first frame support, the first lateral shifting means being operative to shift the first frame support laterally relative to the first wheel frame, and a second lateral shifting means extending between the second wheel frame and the second frame support, the second lateral shifting means being operative to shift the second frame support laterally relative to the second wheel frame.

10. A transport rig for moving a load having a first end and a second end, the transport rig comprising a first load support frame having means on it for carrying the first end of the load, a second load support frame having means on it for carrying the second end of the load, a first frame support means for being engaged with a first set of wheels resting on the ground, the first frame support means being secured to the first load support frame so as to maintain the carrying means thereof above the ground, a second frame support means for being engaged with a second set of wheels resting on the ground, the second frame support means being secured to the second load support frame so as to maintain the carrying means thereof above the ground, and means securing the first and second load support frames together comprising a pair of spaced apart power-driven rotatable winch drums mounted on the first load support frame, a flexible elongated cable in which each end thereof is connected to a separate one of the winch drums to be payed out and reeled in during rotation of the winch drums, first guide means on the first load support frame, and second guide means on the second load support frame, the cable extending in a closed loop from one winch drum around the guide means on the first load support frame and then lengthwise relative to the load around the guide means on the second load support frame and then lengthwise again relative to the load back to the guide means on the first load support frame and then being connected at its opposite end to the other winch drum so that the winch drums can be rotated to shorten the effective length of the cable to squeeze the first and second ends of the load between the first and second load support frames, respectively, whereby the load may be transported as a unit under power supplied by a towing vehicle coupled to one of the frame support means.

11. Apparatus according to claim 10 in which both winch drums are mounted on a common rotatable shift driven by power means mounted on the first load support frame.

12. A transport rig for moving a load having a first end and a second end, the transport rig comprising a first load support frame having means on it for carrying the first end of the load, a second load support frame having means on it for carrying the second end of the load, a first frame support means for being engaged with a first set of wheels resting on the ground, the first frame support means being secured to the first load support frame so as to maintain the carrying means thereof above the ground, a second frame support means for being engaged with a second set of wheels resting on the ground, the second frame support means being secured to the second load support frame so as to maintain the carrying means thereof above the ground, means securing the first and second load support frames together comprising a power-driven rotatable winch drum mounted on the first load support frame, a flexible elongated cable attached to the winch drum to be payed out and reeled in during rotation of the drum, first guide means on the first load support frame, and second guide means on the second load support frame, the cable being engaged with the first and second guide means in addition to the winch drum, to form a closed loop attachment assembly between the first and second load support frames so that rotation of the winch drum shortens the effective length of the cable via the guide means to squeeze the first and second ends of the load between the first and second load support frames, respectively, and means for laterally shifting the first frame support means relative to the first set of wheels and for laterally shifting the second frame support means relative to the second set of wheels, whereby the load may be transported as a unit under power supplied by a towing vehicle coupled to one of the frame support means.

13. Apparatus according to claim 12 in which the lateral shifting means comprises separate laterally extendable and contractable actuating arms connected to the first and second load support frames so that movement of the actuating arms can shift the load laterally either to the left or the right of the longitudinal axis of the first and second wheel support frames.

14. A transport rig for moving a load having a first end and a second end, the transport rig comprising
a first load support frame having means on it for carrying the first end of the load,
a second load support frame having means on it for carrying the second end of the load,
a first frame support means for being engaged with a first set of wheels resting on the ground,
the first frame support means being secured to the first load support frame so as to maintain the carrying means thereof above the ground,
a second frame support means for being engaged with a second set of wheels resting on the ground,
the second frame support means being secured to the second load support frame so as to maintain the carrying means thereof above the ground, and
means securing the first and second load support frame together comprising a power-driven rotatable winch drum mounted on the first load support frame, a flexible elongated cable attached to the winch drum to be payed out and reeled in during rotation of the drum, first guide means on the first load support frame, and second guide means on the second load support frame, the cable being engaged with the first and second guide means independently of the first and second frame support means, in addition to being engaged with the winch drum, to form a closed loop attachment assembly between the first and second load support frames so that rotation of the winch drum shortens the effective length of the cable via the guide means to squeeze the first and second ends of the load between the first and second load support frames, respectively,
whereby the load may be transported as a unit under power supplied by a towing vehicle coupled to one of the frame support means.

15. Apparatus according to claim 14 including an extendible and contractible first actuating arm extending from the first load support frame to a point on the first frame support means spaced from the frame support means point of attachment to the first load support frame, the first actuating arm being operative to pivot the first frame support means about a horizontal axis to raise or lower the first end of the load, and
an extendible and contractible second actuating arm extending from the second load support frame to a point on the second frame support means spaced from the frame support means point of attachment to the second load support frame, the second actuating arm being operative to pivot the second frame support means about a horizontal axis to raise or lower the second end of the load, so that raising or lowering the load by the first and second actuating arms is done independently of the adjustment of the tension in the cable.

16. Apparatus according to claim 14 comprising a pair of spaced apart winch drums mounted on the first load support frame, each winch drum being power driven, and in which each separate end of the cable is connected to a separate one of the power driven winch drums so that the cable extends in a closed loop from one winch drum around guide means on the first load support frame and then lengthwise relative to the load around guide means on the second load support frame and then lengthwise again relative to the load back to guide means on the first load support frame and then is connected at its opposite end to the other power driven winch drum.

17. A transport rig for moving a load driving a first end and a second end, the transport rig comprising
a first load support frame having means on it for carrying the first end of the load,
a second load support frame having means on it for carrying the second end of the load,
a first wheel frame having opposite sides supported by a first set of laterally spaced apart wheels resting on the ground adjacent the first load support frame,
a first frame support pivotally attached to the first wheel frame and extending toward the load for pivotal attachment to the first load support frame so as to maintain the carrying means of the first load support frame above the ground and so that the first frame support pivots about a substantially horizontal axis through its point of attachment to the first load support frame,
a second wheel frame for being supported by a second set of wheels resting on the ground adjacent the second load support frame,
a second frame support pivotally attached to the second wheel frame and extending toward the load for pivotal attachment to the second load support frame so as to maintain the carrying means of the second load support frame above the ground and so that the second frame support means pivots about a substantially horizontal axis through its point of attachment to the second load support frame,
means for raising and lowering the first and second load support frames relative to the ground to raise and lower the object carried between them,
whereby the transport rig and the load may be transported as a unit under power supplied by a towing vehicle coupled to one of the two wheel frames,
means for moving the opposite sides of the first wheel frame laterally away from each other to widen the lateral distance between the wheels on opposite sides of the first wheel frame,
a first lateral shifting means having one end affixed to the first wheel frame and having its opposite end affixed to the first frame support, and a sliding connection between the first wheel frame and the first frame support so that the first lateral shifting means can move the first frame support in a lateral direction relative to the first wheel frame, and
a second lateral shifting means having one end affixed to the second wheel frame and its opposite end affixed to the second frame support, and a sliding connection between the second frame support and the second wheel frame so that the second lateral shifting means can move the second frame support in a lateral direction relative to the second wheel frame,
whereby the first and second load support frames can be moved laterally to shift the lateral position of the load.

* * * * *

UNITED STATES PATENT AND TRADEMARK OFFICE
CERTIFICATE OF CORRECTION

PATENT NO. : 3,929,241
DATED : December 30, 1975
INVENTOR(S) : Alvin A. Putnam

It is certified that error appears in the above-identified patent and that said Letters Patent are hereby corrected as shown below:

| | |
|---|---|
| Col. 1, line 24 | "However" should read --Moreover-- |
| Col. 1, line 43 | "onto" should read --over-- |
| Col. 3, line 24 | "28 should read --38-- |
| Col. 4, line 7 | "form" should read --forms-- |
| Col. 5, line 66 | "estending" should read --extending-- |
| Col. 6, line 32 | "51" should read --52-- |
| Col. 8, line 49 | "axis" should read --axle-- |
| Col. 10, line 30 | "234" should read --324-- |
| Col. 11, line 62 | "336" should read --366-- |
| Col. 13, line 53 | "frame of the second" should read --frame or the second-- |
| Col. 14, line 42 | "A first" should read --a first-- |
| Col. 16, line 27 | "shift" should read --shaft-- |
| Col. 18, line 9 | "load driving" should read --load having-- |

Signed and Sealed this fourth Day of May 1976

[SEAL]

Attest:

RUTH C. MASON
Attesting Officer

C. MARSHALL DANN
Commissioner of Patents and Trademarks